(12) United States Patent
Bauman et al.

(10) Patent No.: US 7,028,966 B2
(45) Date of Patent: Apr. 18, 2006

(54) LAPTOP COMPUTER PAPER SUPPORT DEVICE

(76) Inventors: Mark A. Bauman, 5545 Netherland Ave. #3-C, Bronx, NY (US) 10471; Maxwell N. Bauman, 5545 Netherland Ave. #3-C, Bronx, NY (US) 10471

( * ) Notice: Subject to any disclaimer, the term of this patent is extended or adjusted under 35 U.S.C. 154(b) by 0 days.

(21) Appl. No.: 10/971,232

(22) Filed: Oct. 23, 2004

(65) Prior Publication Data

US 2005/0103953 A1    May 19, 2005

Related U.S. Application Data (63) Continuation-in-part of application No. 10/613,614, filed on Jul. 3, 2003, now Pat. No. 6,851,656.

(51) Int. Cl.
*G04B 37/14*        (2006.01)
(52) U.S. Cl. .................... 248/442.2; 453/910
(58) Field of Classification Search ............ 248/442.2, 248/448, 449, 451, 460, 918
See application file for complete search history.

(56) References Cited

U.S. PATENT DOCUMENTS

| | | | | |
|---|---|---|---|---|
| 5,052,650 A | * | 10/1991 | Beile et al. | 248/451 |
| 5,505,421 A | * | 4/1996 | Marthaler | 248/442.2 |
| 5,601,270 A | * | 2/1997 | Chen | 248/454 |
| 5,855,329 A | * | 1/1999 | Pagano | 248/451 |
| 6,860,458 B1 | * | 3/2005 | Pagano | 248/441.1 |
| 2003/0001063 A1 | * | 1/2003 | Halpin | 248/451 |
| 2003/0001064 A1 | * | 1/2003 | Book | 248/460 |
| 2003/0183738 A1 | * | 10/2003 | Weingartner | 248/453 |
| 2004/0256533 A1 | * | 12/2004 | Eby et al. | 248/460 |

* cited by examiner

*Primary Examiner*—Ramon O Ramirez (57) ABSTRACT

A laptop computer paper support device that includes a shelf member for engaging a laptop computer case, a support member secured to the shelf member for supporting a document, and an extension member pivotally or otherwise adjustably secured to the support member for providing additional support for the document. The extension member may rotate relative to the support member.

30 Claims, 13 Drawing Sheets

LAPTOP COMPUTER PAPER SUPPORT DEVICE

CROSS-REFERENCE TO RELATED PATENT APPLICATION

This is a continuation-in-part of application Ser. No. 10/613,614 filed Jul. 3, 2003 now U.S. Pat No. 6,851,656, now published application No. 20050001135. The disclosure set forth in the referenced application is incorporated herein by reference in its entirety.

BACKGROUND AND SUMMARY

This disclosure relates generally to a laptop computer paper support device.

Related U.S. patent applicant Ser. No. 10/613/614 discloses, among other things, a laptop computer paper support device for removably setting on the top of a laptop computer case that includes a support for holding a document on the top of a laptop computer.

The present disclosure comprises of one or more of the following features or combination thereof disclosed herein or in the Detailed Description below.

The present disclosure relates to a laptop computer paper support device that includes a shelf member for engaging a laptop computer case, a support member secured to the shelf member for supporting a document, and an extension member pivotally or otherwise adjustably secured to the support member for providing additional support for the document. The shelf member, support member and extension member may have any suitable design and features such as, for example, the designs and features described herein.

Additional features of the present disclosure will become apparent to those skilled in the art upon consideration of the following detailed description of illustrative embodiments of the disclosure.

DETAILED DESCRIPTION

An exemplary embodiment of the present disclosure is a laptop computer paper support device for removably setting on the top of a laptop computer case. The device holds at least one document above the laptop computer screen for viewing by the user of the laptop computer. In an exemplary embodiment of the present disclosure, the device comprises a support member and a shelf member. The shelf member is pivotally attached about a connection axis to the support member. The device may be locked into an open position, with the shelf substantially perpendicular to the support member or it may be locked into a closed position with the shelf substantially parallel to the support member. A flange on the bottom of the shelf along with the portion of the support member below the connection axis form a lower pocket for receiving the open top of a laptop computer case. A shelf ledge on the top of the shelf along with the portion of the support member above the connection axis form an upper pocket to hold documents.

An exemplary embodiment of a laptop computer paper support device in accordance with an illustrated embodiment of the present disclosure includes a support member 100 and a shelf member 200. The support member 100 is described in reference to FIGS. 1 and 2, and the shelf member 200 is described in reference to FIGS. 3 and 4. The combination of the support member 100 and the shelf member 200 is described in reference to FIGS. 5 and 6.

Figure 1:
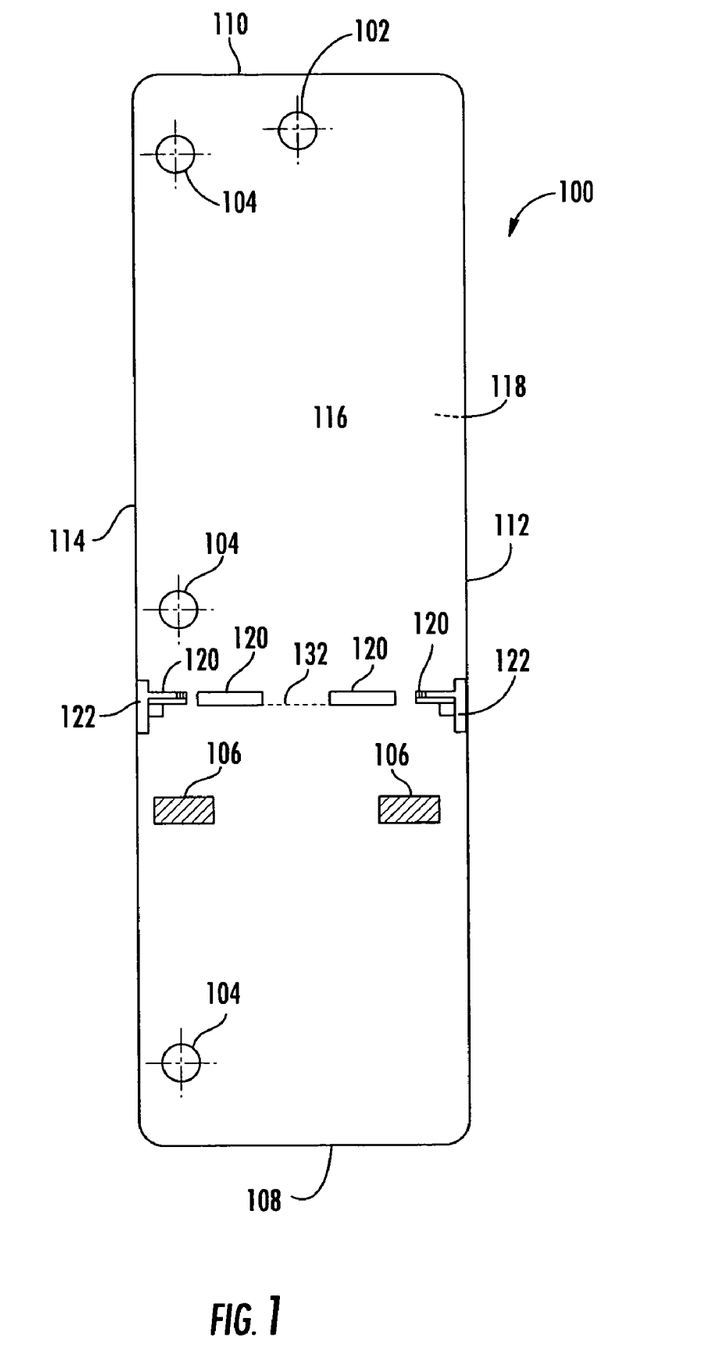
FIG. 1 is a front plan view of a support member of a laptop computer paper support device in accordance with an embodiment of the present disclosure.

FIG. 1 is a front plan view of a support member 100 utilized in an exemplary embodiment of the present disclosure. The support member 100 includes a left edge 114 and a right edge 112 that are parallel to each other and spaced apart from each other. In addition, the support member 100 includes a top edge 110 and a bottom edge 108 that are parallel to each other and spaced apart from each other. The top edge 110 and the bottom edge 108 are substantially perpendicular to the left edge 114 and the right edge 112. In the exemplary embodiment depicted in FIG. 1, the support member 100 is rectangular in shape with rounded edges for easy storage in a notebook, but other shapes are possible. For example the, support member 100 may be trapezoidal or triangular or free-form in shape and the opposite edges are not required to be parallel to each other. The support member 100 also includes a front surface 116 and a back surface 118. The front surface 116 faces the laptop computer user and the back surface 118 faces the rear side of the laptop computer. The support member 100 also includes a connection axis 132 that defines the pivot point for the shelf member 200 that attaches to the support member 100.

FIG. 1 also depicts four shelf support members 120 that are utilized to keep the device in an open position when being utilized to hold a document above the computer screen. The top surface of the shelf member 200 may press against the bottom of the shelf support members 120 when the device is in an open position. In the exemplary embodiment depicted in FIG. 1, the four shelf support members 120 prevent the shelf member 200 from being at substantially less than a ninety-degree angle from the front surface 116 of the support member 100 above the connection axis 132 when the device is in an open position. Other positions of the shelf member 200 with respect to the support member 100 are possible and may be varied based on the placement of the shelf support members 120. In addition, it is possible to utilize just one shelf support member 120 and provide the same functionality described above. The exemplary support member 100 depicted in FIG. 1 also includes two pivot arches 122. The pivot arches 122 are located on the left and right edge of the support member 100 and extend towards the back surface of the support member 100 around the connection axis 132. The pivot arches 122 allow the shelf member 200 to move between the open and closed positions. The pivot arches 122 depicted in FIG. 1 are semi-circles, but any circular shape allowing the shelf member 200 to pivot may be utilized to allow movement between the open and closed positions.

Figure 5:
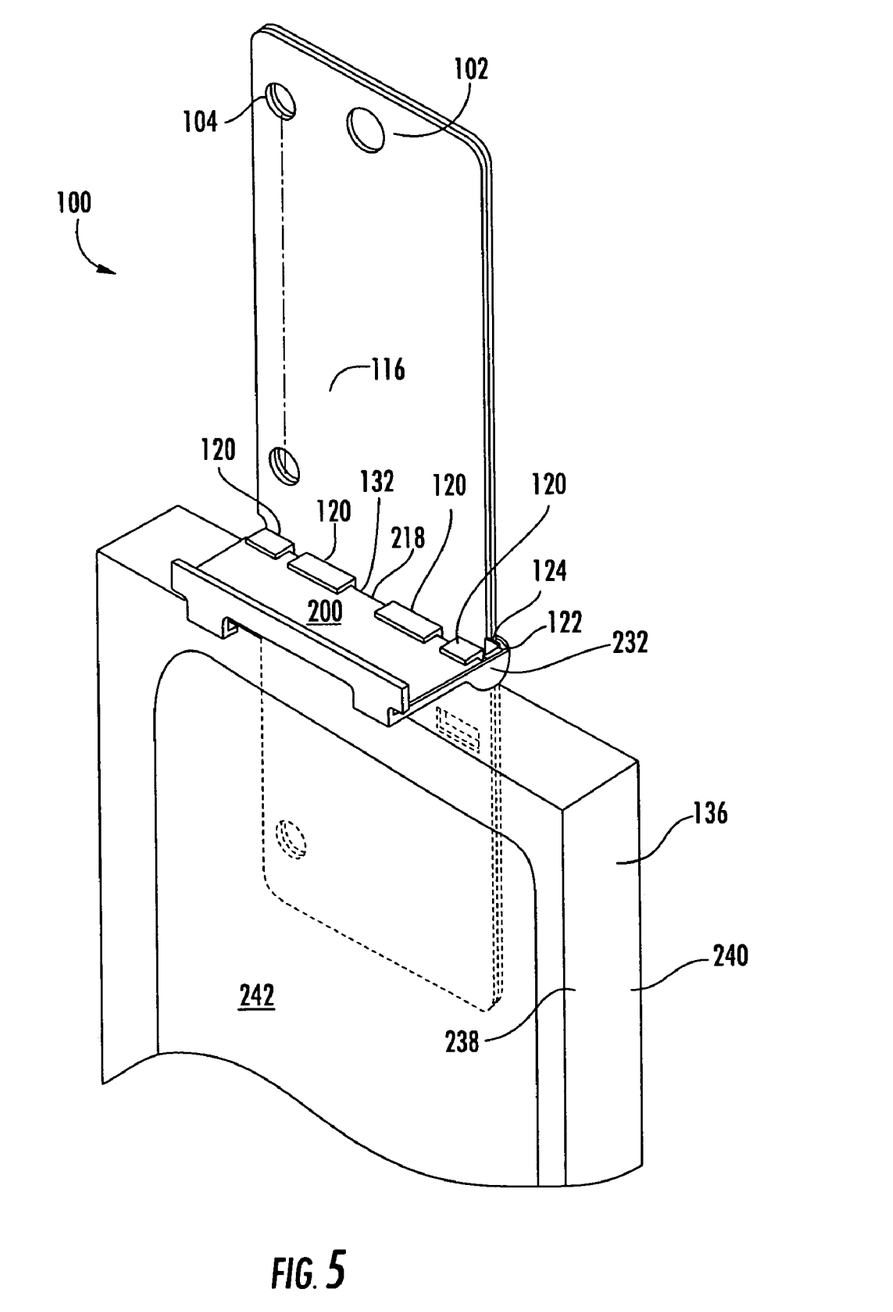
FIG. 5 is a perspective view of the laptop computer paper support device in an open position, attached to the laptop computer case.
Figure 8:
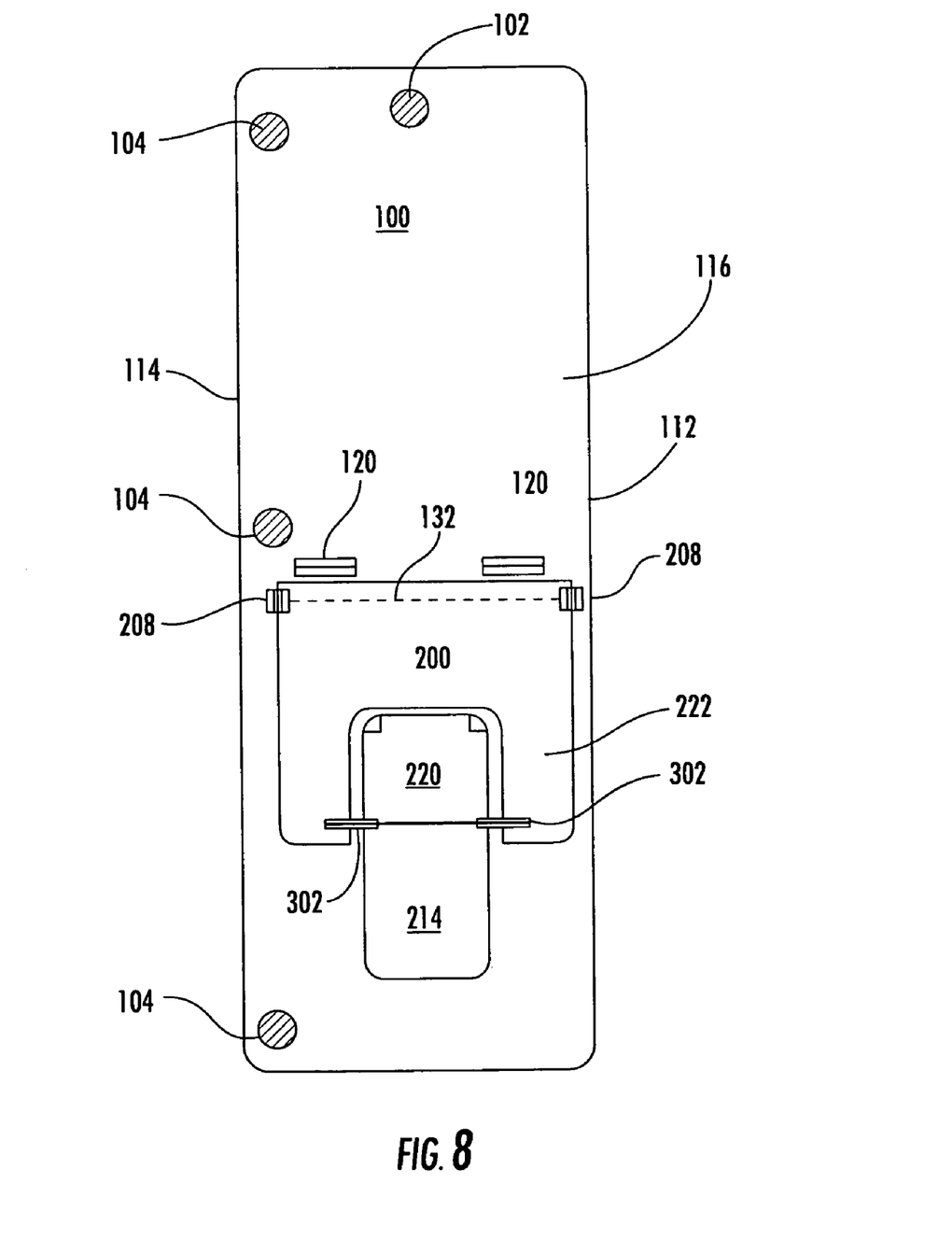
FIG. 8 is a front plan view of the laptop computer paper support device of FIG. 7 in a closed position.
Figure 10:
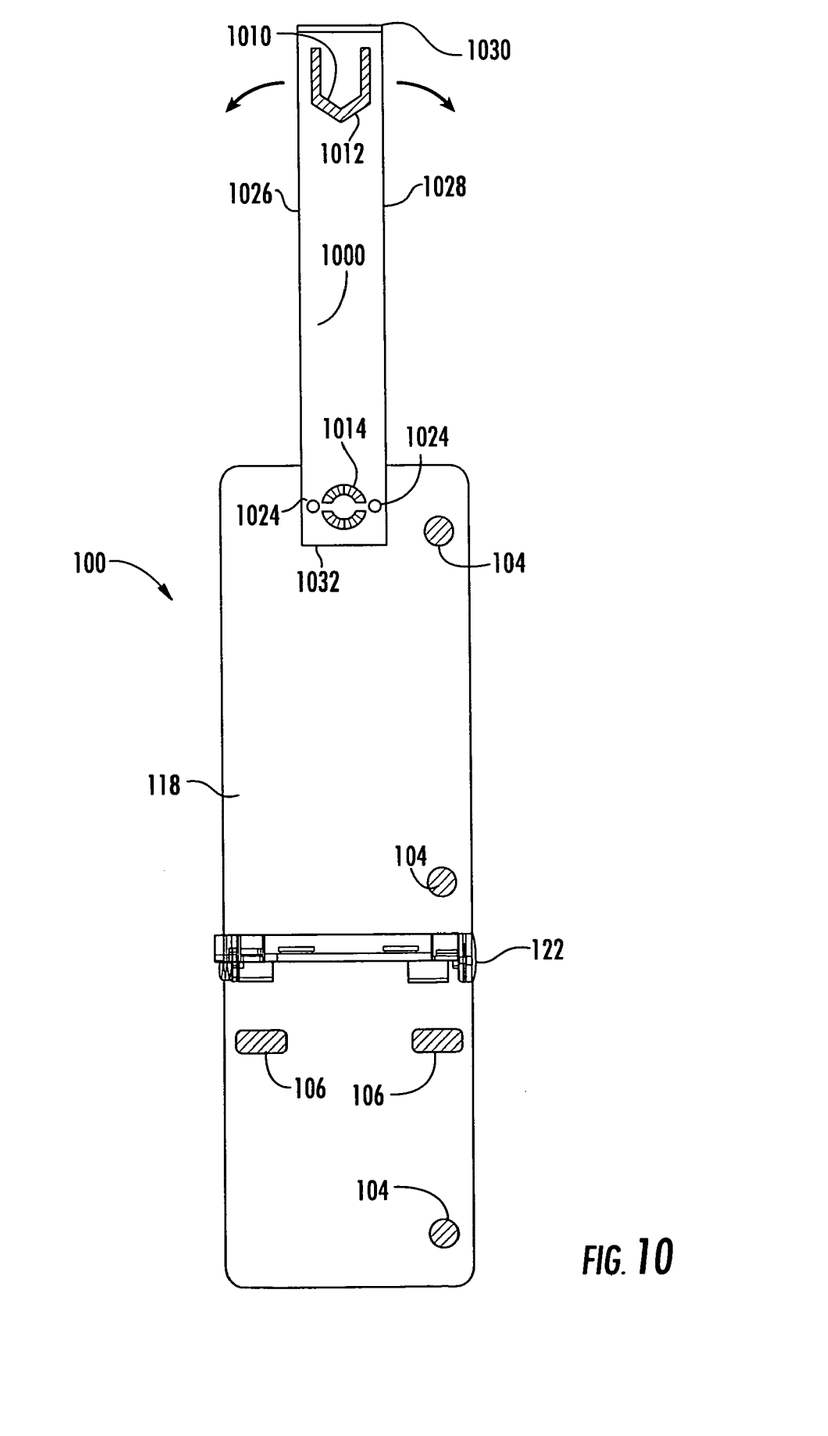
FIG. 10 is a rear plan view of a laptop computer paper support device in accordance with an other embodiment of the present disclosure including an extension member adjustably secured to the support member, illustrating the extension member in an extended position relative to the support member and the shelf member in the open position (shown as a see-through image) and illustrating with arrows on the sides of the extension member pivoting directions of the extension member relative to the support member.
Figure 11:
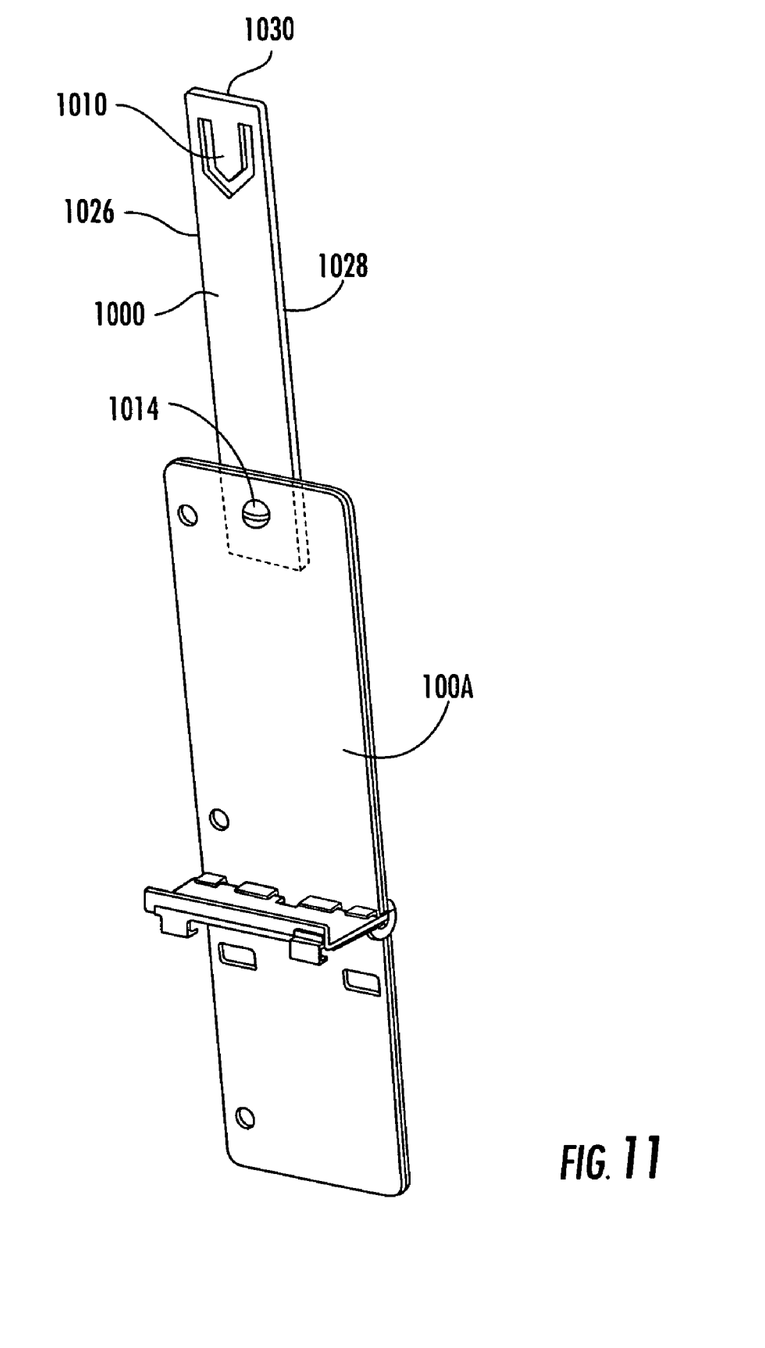
FIG. 11 is a front perspective view of the laptop computer paper support device of FIG. 10 with the shelf and extension members in open and extended positions respectively.
Figure 12:
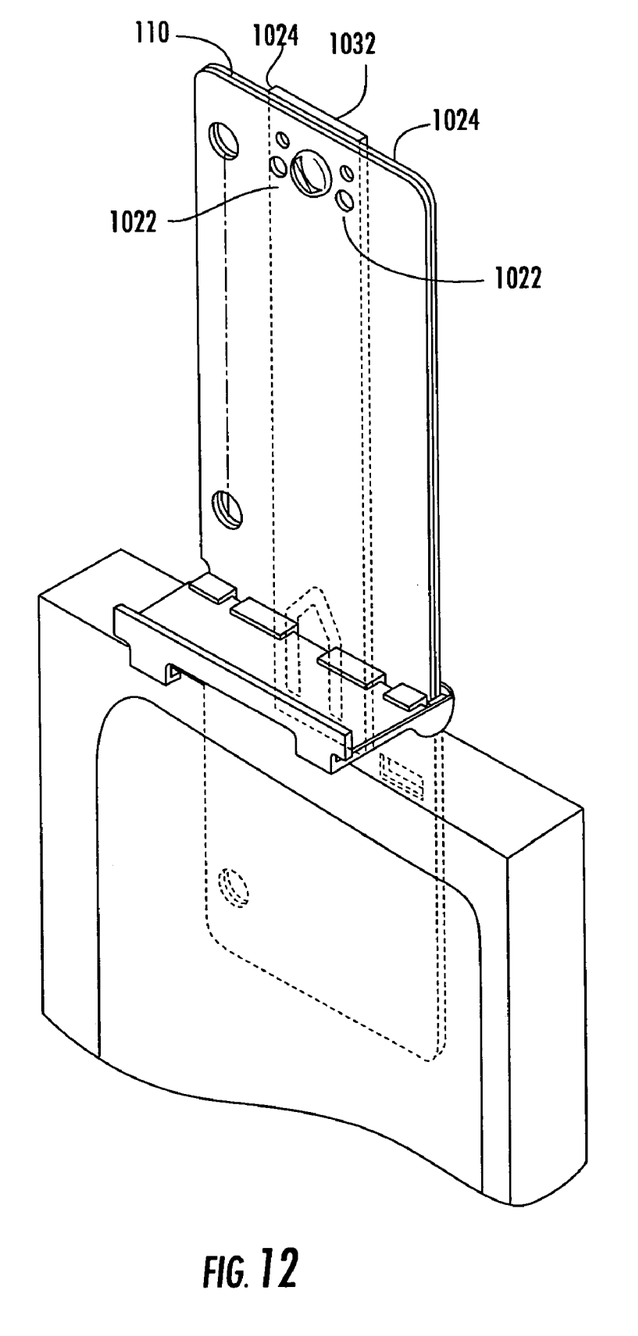
FIG. 12 is a front perspective view of the laptop computer paper support device of FIG. 5 in the operational position on top of the laptop computer case and illustrating the shelf member in the extended position and the extension member is in the closed position and is seen in part as a see-through image.

FIG. 1 also includes an exemplary embodiment of the present disclosure, of a circular aperture 102 that is located adjacent to the top edge 110 of the support member 100 and allows the device to receive the extension member pivot pin 1014, that secures the extension member 1000 to the support member 100 and is referenced in FIGS. 10, 11 and 12. FIGS. 1, 5, and 8 depict the circular aperture 102 without the extension member being attached. The device also includes several ring apertures 104. They may be utilized to store the device in a looseleaf notebook when it is not in use. Generally, the device would be stored in the closed position and would lay flat for storage in a notebook. The number and arrangement of ring apertures may vary based on the type of notebook. In an exemplary embodiment depicted in FIG. 1 there are three ring apertures 104. In an alternate exemplary embodiment there may be seven ring apertures 104 to accommodate a seven-ring notebook. Any arrangement and/or combination of ring apertures 104 are possible and the layout depends on customer requirements. Alternately, the device may be stored in a pocket of a laptop computer case and or a notebook. The device may be stored in the closed position in order to take a minimal amount of space. FIG. 1 also depicts two shelf leg apertures 106. They are utilized by the shelf member leg 234 to lay flat and lock into the closed position when not in use.

Figure 2:
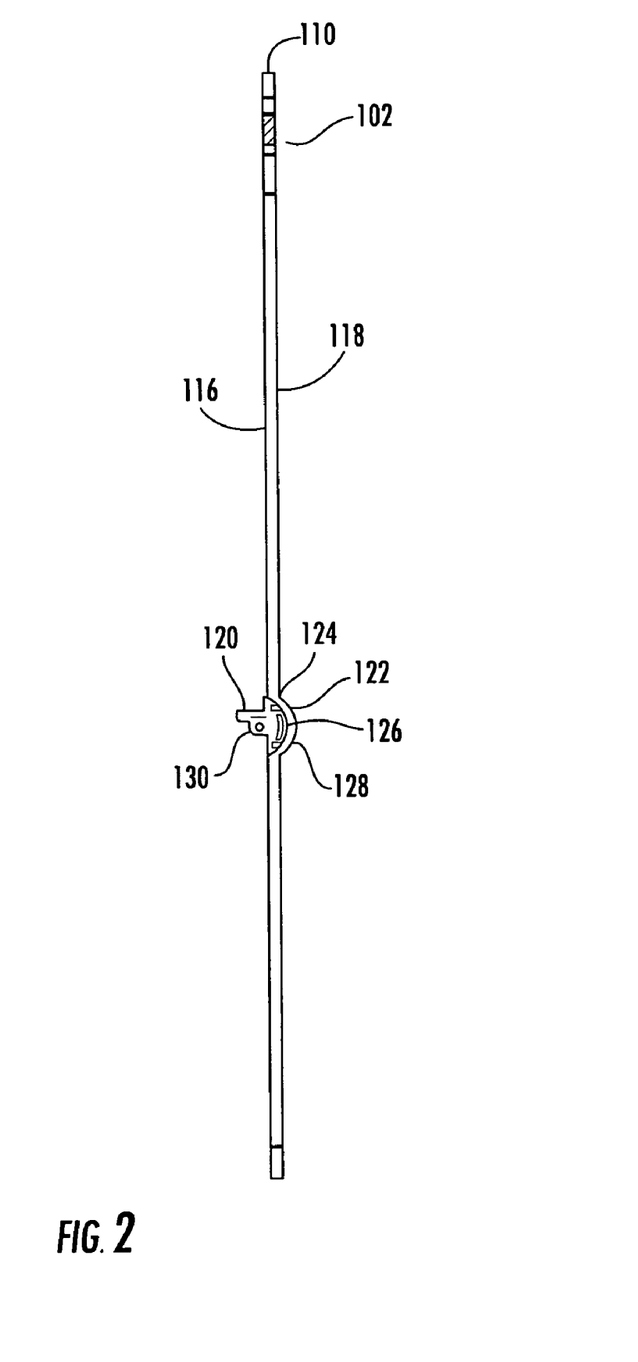
FIG. 2 is a side plan view of the support member of FIG. 1.

FIG. 2 is a side plan view of the support member 100 in FIG. 2 depicts the front surface 116 and the back surface 118. The front surface 116 includes a shelf support member 120 as discussed previously, as well as a pivot aperture 130 for connecting the shelf member 200 to the support member 100. The pivot aperture 130 is located on the connection axis 132 of the support member 200 and is adapted to receive a pivot pin from the shelf member 200 to attach the shelf member 200 to the support member 100. Also depicted in FIG. 2, is a pivot arch 122 along with the closed position aperture 124 is adapted to contain a locking pin on the shelf member 200 when the device is in a closed position. This is an optional aperture and aids in keeping the device in a closed position for storage. In addition, the open position aperture 128 is adapted to contain the locking pin on shelf member 200 when the device is in an open position. The open position aperture 128 along with the locking pin and the shelf support member 120 keep the device in an open position while it is setting on the top of a laptop computer case. In an alternate exemplary embodiment of the present disclosure, one or both of the locking pins and the support members 120 may be utilized to keep the device in an open position. The pivot groove 126 receives the locking pin when the device is being changed from the open position to the closed position and when the device is being changed from the closed position to the open position.

The support member 100 may vary in size and dimension. In an exemplary embodiment of the present disclosure, such as the one depicted in FIG. 1, the support member 100 is substantially planar and rectangular in shape with dimensions of approximately ten inches by about three inches. The size of the support member 100 may vary based on the dimensions of a notebook that the device is targeted to be stored in or on the dimensions of a pocket in a target laptop computer case. In addition, the placement of the connection axis 132 may vary as long as the device still provides room to support and hold documents above the connection axis 132 and the support member 100 still provides leverage against the back of the laptop computer case for holding the device in place when in the open position. In the exemplary embodiment of the present disclosure depicted in FIG. 1, the connection axis 132 is about four inches from the bottom edge 108 and approximately six inches from the top edge 110 of the support member 100. The support member 100 may be any shape that allows for a document resting place and a pocket for setting on the top of a laptop computer case 236 (e.g., kidney shaped, heart shaped, free-form shaped).

Figure 3:
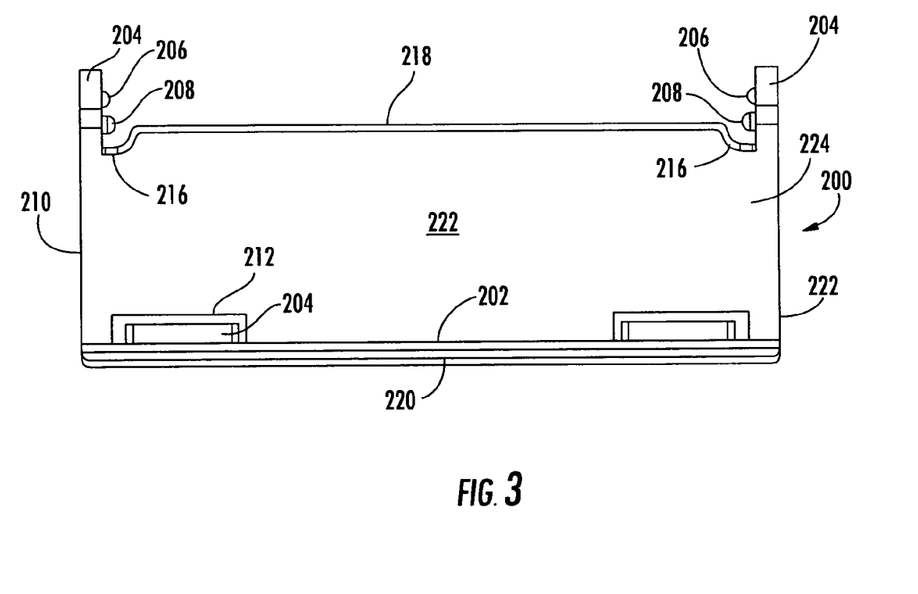
FIG. 3 is a top plan view of a shelf member of a laptop computer paper support device in accordance with an embodiment of the present disclosure.

FIG. 3 is a top plan view of an exemplary embodiment of a shelf member 200. The shelf member 200 includes a top side 208, a bottom side 202, a left side 210 and a right side 226. In addition, the shelf member 200 includes a top surface 222 and a bottom surface 224. The shelf member 200 depicted in FIG. 3 includes two shelf legs 204. Each shelf leg 204 defines a shelf inlet 216 and contains a locking pin 206 and a pivot pin 208. The pivot pin 208 is the connection point of the shelf member 200 to the support member 100. The locking pin 206 aids in keeping the shelf member 200 in an open position by snapping into the open position aperture 128 on the support member 100, or in a locked position by snapping into the closed position aperture 124 on the support member 100. When moving between the closed position and the open position, the locking pin 206 moves through the pivot groove 126 on the support member 100. Also shown in the top plan view of FIG. 3 is a shelf ledge 220, a shelf aperture 212 and flange hooks 234. The shelf aperture 212 is optional and may be included to accommodate plastic mold requirements if the device is molded from plastic or to make the device more compact when being stored in a closed position.

Figure 4:
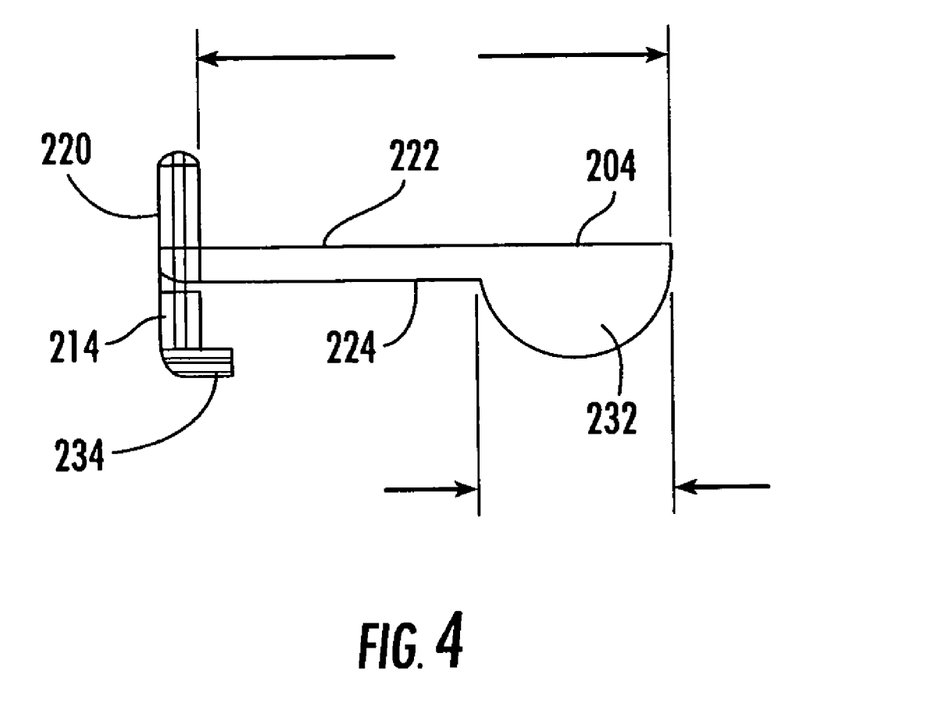
FIG. 4 is a side plan view of the shelf member of FIG. 3.

FIG. 4 is a side plan view of the exemplary shelf member in FIG. 3. The pivot surface 232 may be a semi-circle shaped extrusion that is molded to fit the pivot arch 122 on the support member 100. The pivot surface 232 extends from the lower edge of the shelf leg 204 and includes both the pivot pin 208 and the locking pin 206 located on the inside edge of the shelf leg 204. The top surface 222 of the shelf member 200 includes a shelf ledge 220 for maintaining a document on the top surface of the shelf member 200. The shelf ledge 220 may hold a single sheet of paper, or it may hold a book or magazine. The size of the shelf ledge 220 and the dimensions of the device may be adapted based on the expected type of document or documents to be held in place by the shelf ledge 220. The shelf ledge 220 is attached to the top surface 222 of the shelf member 200 and it extends upwardly from the top surface 222 at a non-zero angle. In the exemplary embodiment depicted in FIG. 4, the shelf ledge 220 extends upwardly from the top surface 222 at about ninety degrees. The bottom surface 224 of the shelf member 200 includes a shelf flange 214 that is adapted for removably retaining the paper support device on the top of a laptop computer case such that the shelf flange 214 is in front of the case while the bottom surface 224 sits atop the case. The shelf flange 214 is attached to the bottom surface 224 of the shelf member 200 and it extends downwardly from the bottom surface 224 at a non-zero angle. In embodiment depicted in FIG. 4, the shelf flange 214 is attached to the shelf member 200 at an angle of about ninety degrees. The shelf flange 214 depicted in FIG. 4 also includes flange hooks 234. The flange hooks 234 are optional and may be utilized to provide a more secure fit for the device on to the top of some types of laptop computers.

The shelf member 200 depicted in FIGS. 3 and 4 has a substantially planar top surface 222 and a substantially planar bottom surface 224 that contains two shelf legs 204 extending from the top side 218 of the shelf member 200. The pivot surface 232 of each shelf leg 204 is shaped as a semi-circle for moving through the pivot groove 126 in the support member 100. In an exemplary embodiment of the present disclosure, the shelf member 200 is about the same width as the support member (e.g., about three inches) and the diameter of the pivot surface 232 is about one-half of an inch. The height of the shelf member 200 depicted in FIGS. 3 and 4 is about one inch, the height of the shelf ledge 220 about one-quarter of an inch, and the height of the shelf flange 214 about one-quarter of an inch. These measurements may vary, but the height of the shelf flange 214 and the shelf ledge 220 will have an impact on the size of the device when it is in the closed position in the embodiment of the shelf member 200 depicted in FIGS. 3 and 4. Similar to the support member 100, the shape of the shelf member 200 may vary.

FIG. 5 is a front perspective view of an exemplary embodiment of the present disclosure in an open position and setting on top of a laptop computer case 236. The device shown in FIG. 5 includes the shelf member 200 being connected to the support member 100 about the connection axis 132 by inserting the pivot pins 208 on the shelf member 200 into the pivot apertures 130 on the support member 100. The device is held in an open position by having the locking pin 206 on the shelf member 200 being inserted into the open position aperture 128 on the support member 100. In addition, the shelf member 200 is pressing up against the shelf support member 120 to keep the shelf member 200 at about a ninety-degree angle from the portion of the front surface 116 of the support member 100 above the connection axis 132.

The device depicted in FIG. 5 is setting on the top of a laptop computer case 236. The laptop computer includes a computer screen 242 on the front of the laptop computer case 238. The pocket formed by the shelf flange 214, the bottom surface 224 of the shelf member 200 and the portion of the support member 100 below the connection axis 132 hold the device on the top of the laptop computer case 236. The portion of the support member 100 below the connection axis 132 rests up against and is substantially parallel with the back of the laptop computer case 240. The flange hooks 234 depicted in FIG. 5 may be utilized to assist in the holding and may be useful when the top of the laptop computer case 236 includes an indentation for accepting the flange hooks 234. With the device in the open position and setting on the top of the laptop computer case 236, the laptop computer user may put documents in the upper pocket defined by the shelf ledge 220, top surface 222 of the shelf member 200 and the front surface 116 of the support member 100 above the connection axis 132.

Figure 6:
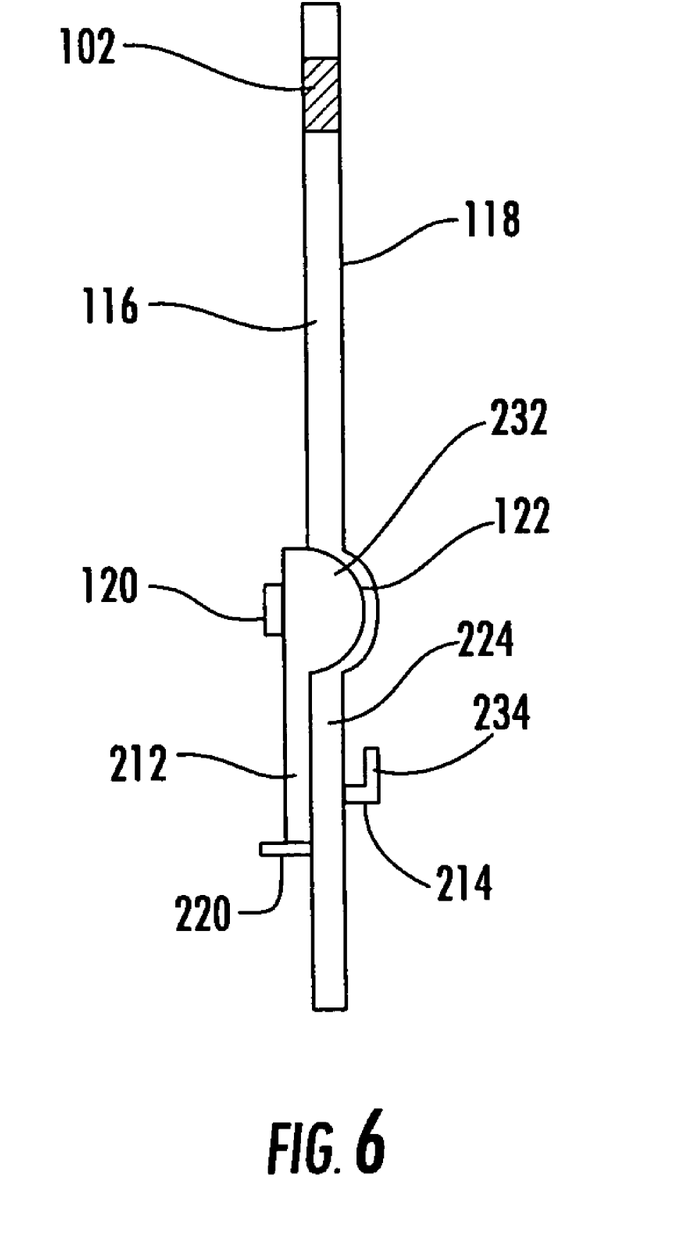
FIG. 6 is a side plan view of the laptop computer paper support device in a closed position.

FIG. 6 is a side plan view of an exemplary embodiment of the present disclosure in a closed position. As described previously, when the device is in a closed position, the locking pin 206 on the shelf member 200 is inserted into the closed position aperture 124 on the support member 100. In addition, a portion of the shelf flange 214 is fit into the shelf leg aperture 106 on the support member 100. In this manner, the storage of the device in the closed position may take up less space. Also shown in FIG. 6, is one of the flange hooks 234 on the portion of the shelf flange 214 that has been inserted through the shelf leg aperture 106 on the support member 100.

Figure 7:
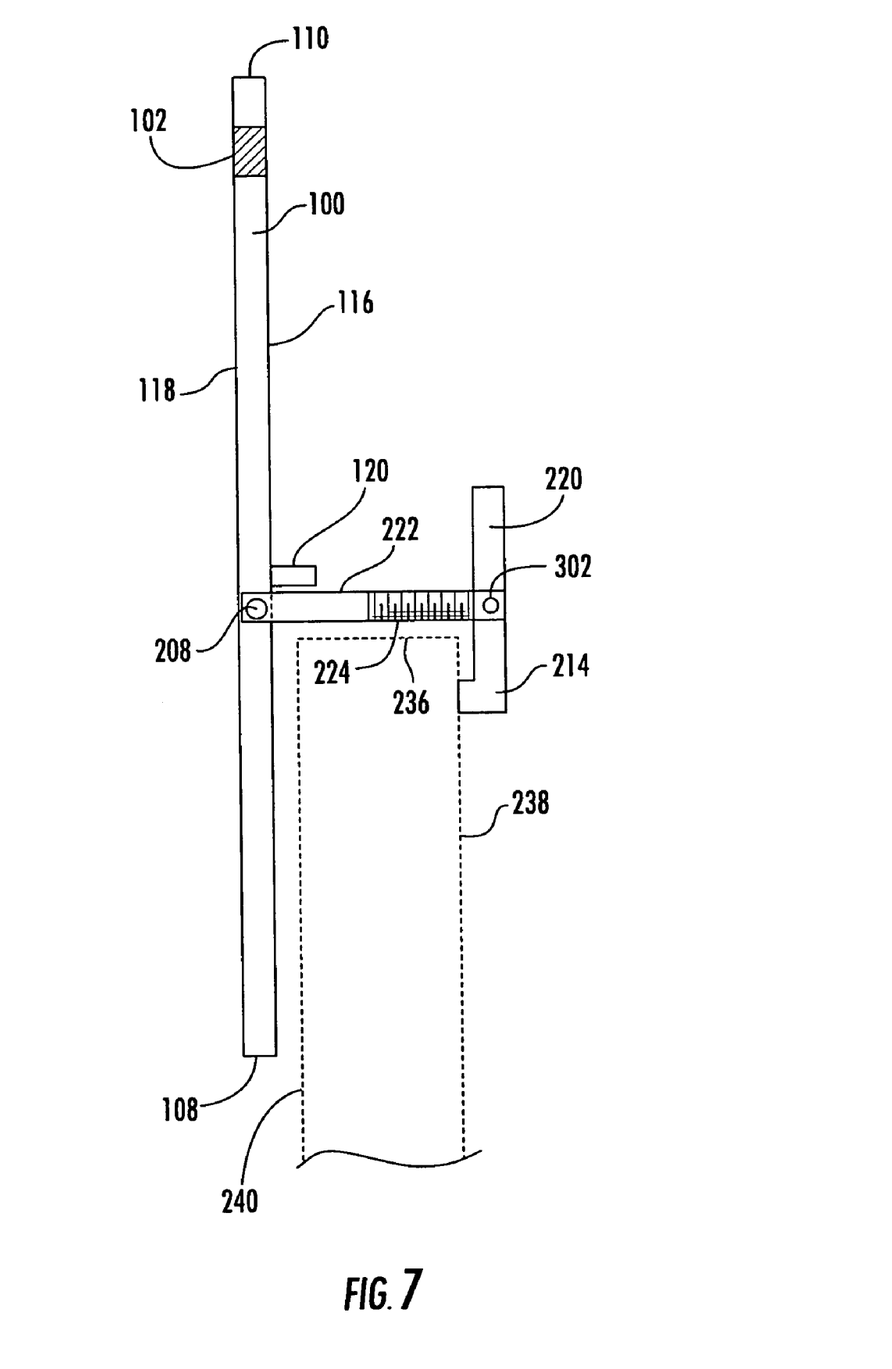
FIG. 7 is a side plan view of the laptop computer paper support device in an open position.

FIG. 7 is a side plan view of an alternate exemplary embodiment of the present disclosure in an open position. The support member 100 is similar to the support member 100 described previously. The shelf member 200 also includes a top surface 222, a bottom surface 224, a shelf ledge 220 and a shelf flange 214. In addition, the shelf member 200 is pivotally attached to the support member 100 by a pivot pin 208. One difference between the two embodiments is that the shelf ledge 220 and the shelf flange 214 are pivotally connected, via a shelf pivot pin 302, to the shelf member 200. In the open position, this alternate embodiment provides the same pocket, formed by the shelf flange 214, the bottom surface 224 of the shelf member 200 and the portion of the support member 100 below the pivot point to hold the device on the top of the laptop computer case 236. Similarly, the pocket defined by the shelf ledge 220, the top surface 222 of the shelf member 200 and the front surface 116 of the support member 100 above the pivot point may be utilized to hold documents for use by the user of the laptop computer.

FIG. 8 is a front plan view of the alternate exemplary embodiment of FIG. 7 in a closed position. This embodiment allows the device to lay almost completely flat when in the closed position. As depicted in FIG. 8, the shelf ledge 222 and the shelf flange 214 lie flat against the front surface 116 of the support member 100 or alternately, against the shelf member 200. The locking mechanisms discussed previously may be utilized to hold the device in either the open position or the closed position. FIG. 8 also depicts a circular aperture 102 that is located adjacent to the top edge 110 of the support member 100 and allows the device to receive the extension member pivot pin 1014, that secures the extension member 1000 to the support member 100 and is referenced in FIGS. 10, 11 and 12. FIGS. 1, 5, and 8 depict the circular aperture 102 without the extension member being attached.

Figure 9:
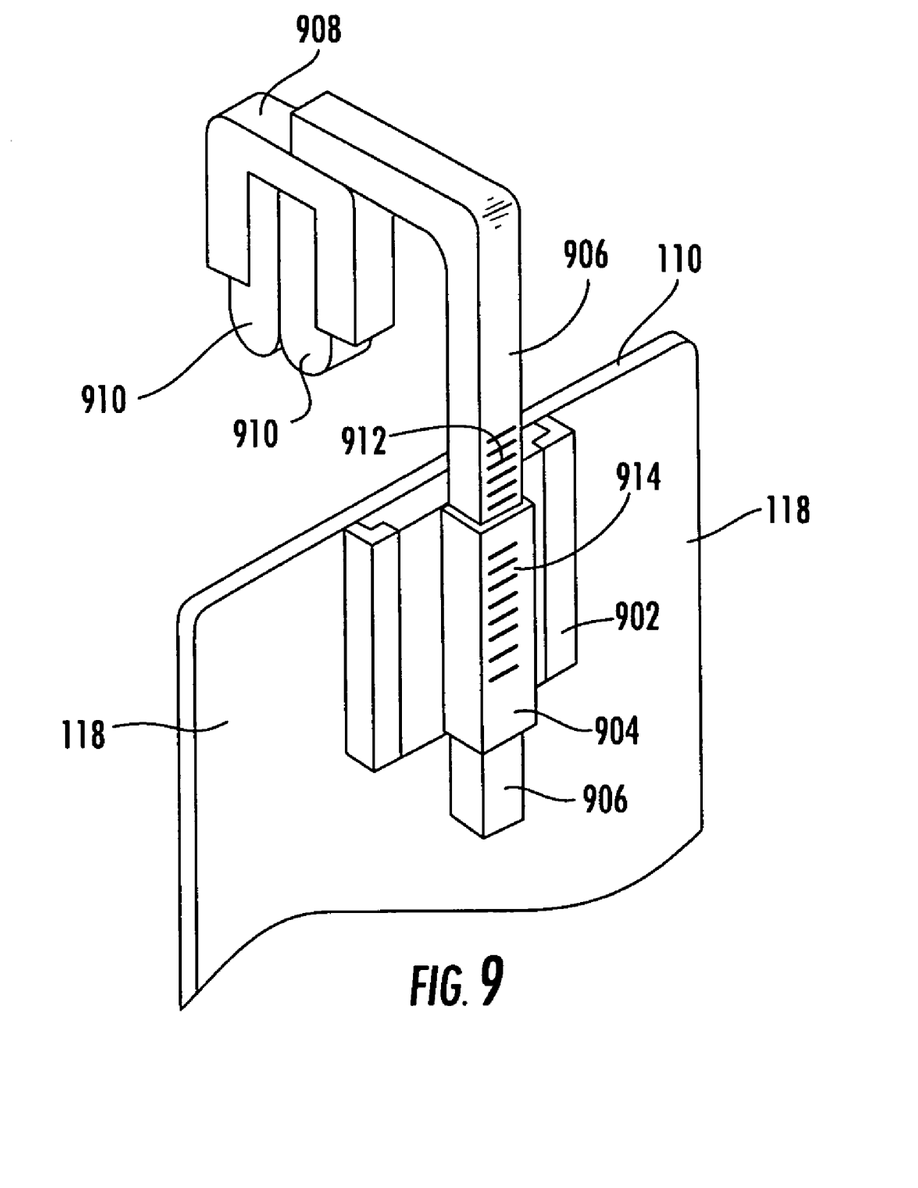
FIG. 9 is a perspective rear view of a laptop computer paper support device in accordance with an other embodiment of the present disclosure including a document clip member.

FIG. 9 is a perspective view of an alternate exemplary embodiment of the present disclosure including a document clip member. As depicted in FIG. 9, an exemplary embodiment of the document clip member includes a hook attachment 902 connected to the back surface 118 of the support member 100. In an exemplary embodiment of the present disclosure, the hook attachment 902 is connected to the support member 100 via the circular aperture 102 and the hook attachment 902 may be removable. The hook attachment 902 includes a hook channel 904. The interior of the hook channel 904 contains a plurality of indents 914 at various heights. The document clip member also includes a hook 906 that is sized to fit into the hook channel 904. The hook 906 also includes a plurality of nubs 912, at various heights, adapted to fit into the indents 914 in the hook channel 904. By moving the hook and connecting the nubs 912 to the indents 914, the hook 906 may be adjusted to fit a variety of document heights. As shown in FIG. 9, the hook 906 extends above the height of the support member 100 and out toward the front surface 116 of the support member 100. Attached to the end of the hook 906 is a hook extension 908 that includes two clips 910 for holding the document in place between the clips 910. In an alternate embodiment of the present disclosure, the hook extension 908 maybe adjusted relative to the front surface 116 of the support member 100 to hold a document close or further from the front surface 116 of the support member 100.

The document clip member depicted in FIG. 9 may be stored flush against the back surface 118 of the support member 100 by pulling the hook 906 out of the hook channel 904 and inserting it back into the hook channel 904 in the opposite direction shown in FIG. 9. By inserting the hook 906 upside down and sideways into the hook channel 904, the laptop computer paper support device may be stored in a more compact manner. In order to do, insert the hook 906 into the hook channel 904, in this manner, the hook channel 904 and the hook 906 must be substantially square in shape. Other manners of implementing the document clip member are possible without departing from the spirit of the disclosure. For example, the hook attachment 902 may be connected to the support member 100 via one or more of the ring apertures (e.g., an example is in FIG. 1 represented by aperture 102) and the hook 906 could extend out past the right edge 112 or left edge 114 of the support member 100 with the clips 910 holding the side edge of a document. Alternatively, the hook attachment 902 could be permanently attached to the support member 100 by using glue or molding it to the support member 100, or the document clip member could just be a standard clip attached to the right edge 112, left edge 114 or top edge 110 of the support member 100.

The laptop computer paper holder support member 100 may be made in a variety of colors as well as other shapes and configurations different from the substantially rectangular shape described in the previous embodiments. Plastic materials and molding techniques known in the art may be utilized to create the device. For example, plastics such as polycarbonate or acrylonitrile butadiene styrene (ABS) may be utilized. The device may be utilized as a marketing tool by adding a company logo to the device. Alternately, a corporation may add frequently called phone numbers or web site addresses to the device. For example, a computer company may include the device with laptop computers and imprint customer assistance numbers and web sites on the device.

In addition, a variety of features may be added to the device so that the device may perform additional functions related to the target customer of the device. For example, a ruler may be drawn on one of the edges of the support member 100, or on of the sides of the shelf member 200. Similarly, the support member 100 may include a cut out section for a gage or measuring device for measurements that are commonly made by the target customer. In addition, the device may include a light for illuminating the document or for use as a flashlight. The light may be built in as a part of the device (e.g., at the top edge 110 of the support member 100, on top of the shelf ledge 220) or it may be removably attached to the device. Another feature that may be added to the support member 100 is a retractable extension to accommodate tall documents. Tracks may be added to the back surface 118 of the support member 100 with a locking mechanism to keep the extension in an extended or non-extended position. Another feature that could be incorporated into the device is a compact calculator on the support member 100. The previous list of additional features is meant to be descriptive and not limiting as other additions are possible and depend on target customer requirements.

As described previously, an exemplary embodiment of the present disclosure provides a portable, compact and lightweight device for holding a document above a laptop computer screen 242. In addition, the laptop computer paper holder sets on the top of the laptop computer case 236 and is therefore easily attached and detached from the laptop computer case for use in a variety of environments including environments where there is substantially no workspace available for document reference. Likewise, the flat nature of the laptop computer paper support device allows it to be conveniently stored and carried by a traveler until it is set on top of the laptop computer case 236. The ability to imprint company and product information on the device and to tailor additional features for the device based on the target customers make the device useful as a marketing tool.

FIG. 10-12 disclose a further embodiment of the present disclosure comprising a support member 100, a shelf member 200 and an extension member 1000 adjustably secured to the support member. The support member 100 and the shelf member 200 may have any suitable configurations as previously referenced.

FIG. 10 depicts the device in a rear plan view. The extension member 1000 may have any suitable construction and may be adjustably secured to or otherwise associated with the support member 100 in any suitable manner. In the illustrated embodiment, for example, the extension member 1000 is elongated, is generally rectangular, and extends generally parallel to the support member 100. The extension member 1000 is pivotally secured to the support member 100 so that the extension member can pivot 360 degrees relative to the support member. The extension member 1000 may be positioned, for example, in a fully extended support position (see e.g., FIG. 10 or 11), in a collapsed position (see, e.g., FIG. 12) or in any lateral position relative to the connecting aperture 102 as depicted in FIGS. 1, 5 and 8.

The illustrated extension member 1000 defines adjacent one end a pivot pin that may for example, be in the form of a pressure snap pin 1014 atop an axle that is a molded part of the extension member 1000 and extends from the extension member 1000 and is received by a hole or aperture 102. The pressure snap pin 1014 includes two fingers which terminate in engaging portions 1018 which has been describe here as an axle which is located below the pressure snap pin 1014.

Figures 13A, 13B, 13D, 13E, 13F:
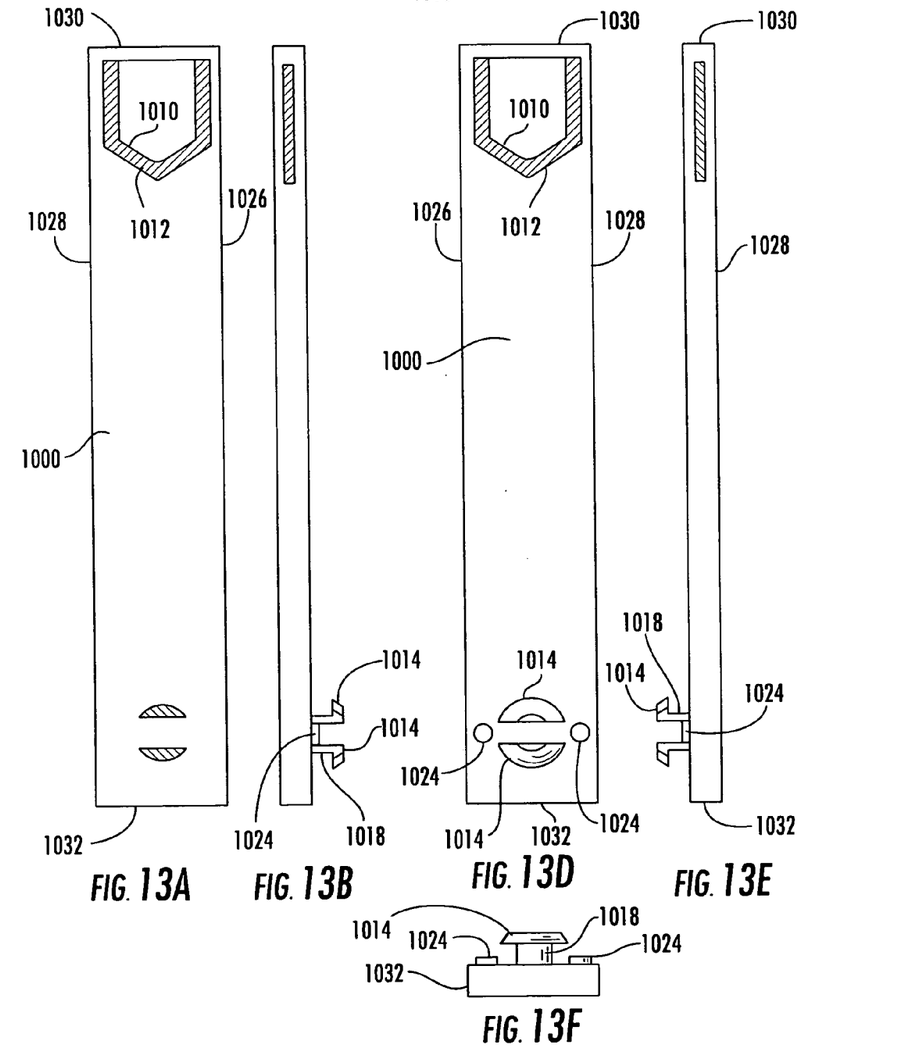
FIG. 13A-13F depicts top, bottom, front, back, left and right side plan views of the extension member of FIG. 10 and FIG. 11.
Figure 13C:
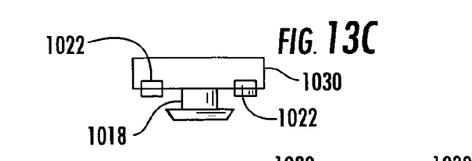

FIGS. 10, 11 and 13 illustrate the extension member 1000 to include at the other end a clip 1010 for engaging the one or more documents. The clip 1010 may have any suitable construction. The illustrated clip 1010, for example, comprises a cut out feathered section that defines a rectangle with a triangle top 1012 at its point. The clip is flexible to allow for the engagement of the one or more documents.

The extension member 1000 may instead extend from the support member 100 and be received by a hole defined by the extension member 1000 in accordance with an other embodiment. The extension member 1000 may be engaged in any other suitable manner that permits rotation of the extension member 1000 relative to the support member 100 in accordance with other embodiments. The permitted rotation of the extension member 1000 relative to the support member 100 may be 360 degrees or less. Alternately, the extension member 1000 may be secured to the support member 100 in a manner that permits movement other than, or in addition to, pivoting movement in accordance with other embodiments.

The device also may include any suitable means for releasably locking the extension member 100 in place at different positions relative to the support member 100. In the illustrated embodiment, for example, the releasably locking means is configured so that it can releasably lock the extension member in the fully extended position, the collapsed position, and at various rotation degrees increments in either direction there between and relative to the support member 100.

FIG. 13 depicts the extension member 100 from a rear plan view (referenced as Section A-A); left side plan view (referenced as Section A-B); and top plan view referenced as Section A-C); a bottom plan view referenced as Section B-C); a front plan view (referenced as Section B-A) and a right side plan view referenced as Section B-B). The extension member herein illustrated has a left edge 1026 and a right edge 1028. A top edge 1030 and a bottom edge 1032. Depicted is the releasable locking means comprising or two bores 1024, that correspond to two detents 1022 located on the support member 100 on the rear side 118 positioned parallel to the extension member 1000 receiving hole aperture 102. The detents 1022 and bores 1024 can have any suitable number and be positioned at any suitable locations. Additionally, the detents can instead be found on the extension member 1000 and the bores may instead be defined on the support member 100, in accordance with other embodiments.

FIG. 13A-13F depicts the extension member 100 from a rear plan view (referenced as Section A-A); left side plan view (referenced as Section A-B); and top plan view (referenced as Section B-C); a front plan view (referenced as Section B-A) and a right side plan view (referenced as Section B-B) . The extension member herein illustrated has a left edge 1026 and a right edge 1028. A top edge 1030 and a bottom edge 1032. Depicted is the releasable locking means comprising or two bores 1024, that correspond to two dents 1022 located on the support member 100 on the rear side 118 positioned parallel to the extension member 100 receiving hole aperture 102. The dents 1022 and bores 1024 can have any suitable number and be positioned at any suitable locations. Additionally, the detents can instead be found on the extension member 1000 and the bores may instead be defined on the support member 100, in accordance with other embodiments.

While the present disclosure has been described with reference to illustrated embodiments, it will be understood by those skilled in the art that various changes may be made and equivalents may be substituted for elements thereof without departing from the scope of the disclosure. In addition, many modifications may be made to adapt a particular situation or material to the teachings of disclosure without departing from the essential scope thereof. Therefore, it is intended that the disclosure not be limited to the particular embodiment disclosed as the best mode contemplated for carrying out this disclosure, but that the disclosure will include all embodiments falling with the scope of the appended claims.

The invention claimed is:

1. A laptop computer paper support device for removably engaging a laptop computer case and for supporting at least one document, the device comprising:
   a shelf member for removably engaging the laptop computer case;
   a support member secured to the shelf member for supporting the document;
   an extension member adjustably secured to the support member for providing additional support for the document; and
   a pivot pin for adjustably securing the extension member to the support member.

2. The device of claim 1 wherein the extension member includes a clip for engaging the document.

3. The device of claim 2 wherein the clip defines a cutout for receiving the document.

4. The device of claim 3 wherein the cutout is rectangular with a triangle shape at its point.

5. The device of claim 1 wherein the pivot pin comprises a pressure snap pin.

6. The device of claim 1 further comprising means for releasably locking the extension member at different position relative to the support member.

7. The device of claim 6 wherein the releasable locking means comprises of two detents formed on one of the support member and the extension member and the two bores defined on the other of the extension member and the support member receiving the bores to releasably lock the member to the extension member to the support member.

8. The device of claim 1 wherein the extension member is pivotally secured to the support member and further comprising means for releasably locking the extension member at different rotational position relative to the support member.

9. The device of claim 8 wherein the releasably locking means comprises two detents formed on one of the support member and two bores defined on the other of the extension member and the support member receiving the bores to releasably lock the member to the support member.

10. A laptop computer paper support device for removably engaging a laptop computer case and for supporting at least one document, the device comprising:
   a shelf member for removably engaging the laptop computer case;
   a support member secured to the shelf member for supporting the document; and
   an extension member adjustably secured to the support member for providing additional support for the document wherein the extension member is pivotally secured to the support member.

11. The device of claim 10 wherein the extension member is pivotable relative to the support member between a fully open position and a closed position.

12. The device of claim 10 wherein the extension member is pivotable relative to the support member between a left lateral position and a right lateral position.

13. The device of claim 10 wherein the extension member is pivotable 360 degrees relative to the support member.

14. The device of claim 10 wherein the shelf member is pivotal relative to the support member between first and second positions, the shelf member configured to engage the laptop computer case in the second position.

15. The device of claim 14 wherein the shelf member extends substantially perpendicular to the support member when it is in the second position.

16. The device of claim 14 wherein the shelf member extends substantially parallel to the support member when it is in the first position.

17. A laptop computer support device for removably engaging a laptop computer case and for supporting at least one document, the device comprising:

a support member for supporting the document;

a shelf member pivotally secured to the support member, the shelf member being pivotal between a first and second positions and being configured to removably engage the laptop computer case in the second position: and an extension member pivotally secured to the support member for providing additional support for the document.

18. The device of claim 17 wherein the shelf member extends substantially parallel to the support member when it is in the first position, and substantially perpendicular to the support member when it is in the second position.

19. The device claim 17 wherein the extension member includes a clip for engaging the document.

20. The device of claim 17 including a pivot pin pivotally securing the extension member to the support device.

21. In combination, a laptop computer and a laptop computer paper support device, said laptop computer paper support device comprising:

a support member for supporting a document;

a shelf member pivotally attached to said support member and removably engaged with the laptop computer case; and an extension member adjustably secured to the shelf member for further supporting the document.

22. A laptop computer paper support device for removably engaging a laptop computer case and for supporting at least one document above a screen on the laptop computer case, said laptop computer paper support device comprising:

a support member including a front surface, a top edge, a bottom edge, a left edge and a connection axis passing through said left edge and said right edge, wherein said connection axis is substantially perpendicular to the said left edge;

a shelf member pivotally attached at said connection axis to the front surface of said support member, said shelf member including:

a top surface and a bottom surface;

a shelf ledge adapted for maintaining a document upon the top surface of the shelf member, said shelf ledge attached to the top surface and extending upwardly from the top surface at a non-zero angle; and a shelf flange adapted for setting on the top of a laptop computer case, said shelf flange attached to the bottom surface and extending downwardly from the bottom surface at a non-zero angle:

wherein the shelf member is movable between an open position wherein the shelf member is substantially perpendicular to the support member and a closed position wherein the shelf member is substantially parallel to the support member; and an extension member adjustably secured to the support member to further support the document.

23. The device of claim 22 wherein the extension member is pivotally secured to the support member.

24. The device of claim 23 wherein the extension member is pivotable relative to support member between vertical and lateral positions.

25. The device of claim 23 wherein the extension member is pivotable relative to support member between a left lateral position and a right lateral position.

26. The device of claim 22 further wherein the extension member includes a clip for engaging the document.

27. The device of claim 26 wherein the clip defines a cutout for receiving the document.

28. The device of claim 27 wherein the cutout is rectangular with a triangle shape at its point.

29. The device of claim 22 including a pivot pin for adjustably securing the extension member to the support member.

30. The device of claim 22 further comprising means for releasably locking the extension member at different positions relative to the support member.

* * * * *